Patented Sept. 4, 1945

2,384,034

UNITED STATES PATENT OFFICE 2,384,034

POLYVINYL ACETAL COMPOSITION AND CEMENT

Charles William Johnson, New Brunswick, N. J., assignor to E. I. du Pont de Nemours & Company, Wilmington, Del., a corporation of Delaware No Drawing. Application April 22, 1942,
Serial No. 440,085

7 Claims. (Cl. 260—73)

This invention relates to the treatment of polyvinyl acetal resins and particularly to their insolubilization. It further relates to the manufacture of plywood.

Polyvinyl acetal resins are of great utility. However, their utility is limited in certain applications because of the solubility of the resin in organic solvents such as alcohol, toluene and acetone. Furthermore when used as adhesives in the bonding of laminae to form plywood polyvinyl acetal resins do not have as high dry heat and/or hot water shearing test properties as are desirable and, in some plywood applications, necessary.

This invention has as an object improved polyvinyl acetal resin compositions. Another object is the provision of improved polyvinyl acetal resin cements. A further object is a process of making an improved plywood. Another object is an improved process of cementing objects. Other objects will appear hereinafter.

These objects are accomplished by the following invention of polyvinyl acetal compositions comprising a monocyclic urea having on each cyclic urea nitrogen a methylol group etherified with a volatile alcohol, i. e., one boiling not higher than 210° C. and the use of such compositions as cements and particularly for plywood.

The more detailed practice of the invention is illustrated by the following examples, wherein parts given are by weight. There are of course many forms of the invention other than these specific embodiments.

Example I

An adhesive solution was prepared by dissolving 17 parts of polyvinyl butyral resin in 27 parts of ethyl alcohol and 6 parts of butyl acetate, adding 33.3 parts ethyl alcohol to the resin solution and then a solution of 1.7 parts dibutyl phthalate in 15 parts of ethyl alcohol. To this composition 2.5 parts of N,N'-bis(methoxymethyl)uron and 0.3 part of aluminum chloride catalyst are added. Two coats of the modified cement were applied to veneer strips and dried for 24 hours at room temperature. They were then joined in a hydraulic press at 100 lbs. per square inch and 100° C. for 10 minutes.

Dry heat and hot water shearing tests were run on these samples and on similar laminations prepared from an adhesive of the same composition but omitting the N,N'-bis(methoxymethyl)uron. It was found that the laminations based on the modified adhesive withstood a temperature of 175° C.+ under a shearing stress without slipping or separating whereas laminations with the unmodified adhesive failed at 144° C. under the same shearing stress. Also, the laminations bonded with the modified adhesive withstood 30 minutes in boiling water under a shearing stress without slipping or separating, and the corresponding blank was found to fail at 73° C. under the same shearing stress.

Identical results were obtained with cements wherein tetrahydro - 1,3 - bis(methoxymethyl)-5-methyl-2(1)-s-triazone was substituted for the N,N'-bis(methoxymethyl)uron of the above example.

Example II

An adhesive composition similar to that of Example I but employing 3.0 parts of N,N'-bis-(methoxymethyl)uron and no catalyst was prepared.

One coat of the modified adhesive composition was brushed on the surface of plywood strips which were then dried at room temperature for 24 hours. They were then joined under a pressure of 100 lbs. per square inch at a temperature of 100° C. for 10 minutes and then cooled under pressure. The dry heat shear test for the plywood bonded with this material was 175° C.+ and the hot water shear test 92° C., whereas the control blanks failed at 146° C. in the dry heat test and at 75° C. in the hot water test.

Example III

An adhesive comprising 97 parts by weight of polyvinyl formal, 2.5 parts of N,N'-bis(methoxymethyl)uron, 0.5 part of aluminum chloride, and 455 parts of ethylene dichloride was employed to laminate wood veneer by the procedure of Example I. The wood veneer laminations withstood 177° C.+ in the dry heat shear test without failure whereas wood veneer laminations prepared with a similar cement omitting the N,N'-bis-(methoxymethyl)uron and catalyst failed at 132° C. in the dry shear test.

Example IV

Two solutions were prepared one, solution A, containing 20 parts of polyvinyl butyral resin, 45 parts of denatured alcohol and 35 parts of toluene. The second, solution B, contained the same amounts of resin, alcohol, and toluene but in addition conttained 2.5 parts of N,N'-bis(methoxymethyl)uron and 0.3 part aluminum chloride as a catalyst. Films were cast of solution A and solution B and were variously dried i. e., for 3 days at room temperature or for 90 minutes at 65° C. The films were stripped from the glass plate and samples of each immersed in acetone, toluene, ethyl alcohol or water and the time noted for dissolution.

In the air dried samples those from solution B showed substantially no dissolving action in the several liquids although the corresponding air dried films from solution A were dissolved in 6 seconds in acetone, 10 seconds in toluene and 3 seconds in alcohol. The films from both solution A and solution B were apparently unaffected by water. The film from solution B showed a slight blushing and curling effect on immersion in alcohol.

In the films dried at 65° C. for 90 minutes those from solution A dissolved in alcohol in 5 seconds, in acetone in 15 seconds and in toluene in 20 seconds. Those from solution B did not dissolve at all in these solvents nor did the solution B film dried at 65° C. blush or curl in alcohol.

In the dry heat shearing test mentioned above the test specimens are composed of three plies laminated cross grain so as to form a laminated area of one square inch. The samples are suspended in an oven under a 4.41 lb./sq. in. shearing stress. The oven temperature is increased from 100° F. to 300° F. in increments of 4° F. per minute and the temperature (bulb of thermometer in oven and in vicinity of laminated portion of the sample) at which the break occurs is recorded.

In the hot water shearing test the samples are first immersed in water at room temperature for 24 hours. They are then suspended in a hot water bath at 100° F. under a 5.00 lb./sq. inch shearing stress. The temperature of the water is raised from 100° F. to 212° F. in increments of approximately ½° F. per minute and the temperature at which the break occurs is recorded. The bulb of the thermometer is placed in the vicinity of the laminated portion of the test samples and at the same depth in the water.

While the invention is exemplified with polyvinyl butyral resin as this is a particularly preferred species because, inter alia, of its commercial availability, the invention is applicable to any polyvinyl acetal resin including resins of this class prepared from formaldehyde, acetaldehyde, butyraldehyde, propionaldehyde and valeraldehyde, etc.

Similarly the examples illustrate the use of N,N'-bis(methoxymethyl)uron as the modifying agent for the polyvinyl acetal resin as this is the preferred species. The invention is, however, generic to such use of any monocyclic urea having on each urea nitrogen a methylol group etherified with a volatile alcohol, preferably an alkanol, boiling not higher than 210° C. Thus there may be employed any compound of the following formula

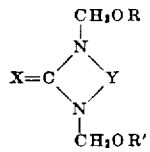

where X is a chalcogen of atomic weight less than 33, i. e., oxygen or sulfur; R and R', which may be identical or different, represent the non-hydroxy portion of a monohydric alcohol boiling below 210° C. at 760 mm.; and Y is a divalent acyclic organic radical of chain length 2 or 3, both terminal atoms of which are carbon, any other chain member present being carbon, oxygen, sulfur or tertiary nitrogen, and wherein all hydrogen atoms are attached only to carbon.

Among the radicals represented by Y in the above formula, wherein the Y forms, with the etherified N,N'-di-methylolureylene radical, a heterocyclic ring of from 5 to 6 atoms, the most important ones are

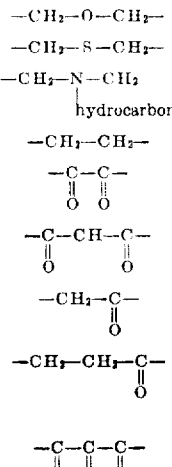

and

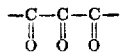

The alcohols corresponding to the radicals R and R' include methyl, ethyl, propyl, isopropyl, butyl, isobutyl, amyl, hexyl, octyl, benzyl, furfuryl, tetrahydrofurfuryl, methoxyethyl, ethoxyethyl alcohols, and in general any monohydric alcohol boiling below 210° C. at 760 mm. Among the compounds which may be employed in the process of this invention are, in addition to those of the examples, tetrahydro-1,3-bis(methoxymethyl)-5-methyl-2(1)-s-triazone, tetrahydro-1,3-bis-(methoxymethyl)-5-b e t a-hydroxyethyl-2(1)-s-triazone, N,N'-bis(methoxymethyl)ethyleneurea, 3,5-bis(methoxymethyl)tetrahydro-1,3,5-thiadiazine-4-one; N,N'-bis(methoxymethyl)parabenic acid; N,N'-bis(propoxymethyl) barbituric acid; N,N'-bis(methoxymethyl) isobarbituric acid;N,N'-bis(methoxymethyl)alloxan; N,N'-bis(benzyloxymethyl)uron; N,N'-bis(furyloxymethyl)uron, etc. Of these materials, the preferred ones, from the standpoints of availability and results, are the N,N'-bis(alkoxymethyl)urons, and still more preferred are those N,N'-bis(alkoxymethyl)urons in which the radicals R and R' of the above general formula are hydrocarbon.

The cyclic urea derivative is used in the proportion of 0.5 to 50% by weight of the polyvinyl acetal but with 2 to 10% preferred.

While a catalyst is not necessary the results obtained with the use of a catalyst are such that a catalyst is preferred. This is used in amount up to 50% by weight based on the cyclic urea derivative but 10 to 30% by weight is preferred. While the examples disclose the use of aluminum chloride any catalyst known to facilitate acetal formation and interchange may be employed, including p-toluenesulfonic acid, hydrochloric acid, sulfuric acid, phosphoric acid, zinc chloride, ferric chloride, ammonium chloride, boron trifluoride, sulfonium iodides, etc.

While polyvinyl acetals are particularly susceptible to advantageous modification with the cyclic urea ethers of this invention and show advantages even with room temperature treatment, the advantages of the invention are more markedly shown when the modifications of the polyvinyl acetal is accomplished at elevated temperature preferably at 50–200° C.

The cements of this invention may be employed for general cementing purposes such as joining metal surfaces to metal surfaces (particularly aluminum to aluminum), preparation of shatterproof glass, shoe cements and for laminating fabric, paper, and the like, but are particularly useful in the cementing of plywood since hitherto polyvinyl acetal resins have suffered from the disadvantage of such a low softening point as to preclude their use in plywood for many applications, e. g., in aircraft construction.

The above description and examples are intended to be illustrative only. Any modification of or variation therefrom which conforms to the spirit of the invention is intended to be included within the scope of the claims.

What is claimed is:

1. A composition comprising a polyvinyl acetal resin and, as a softening point elevating agent therefor, an ether of the formula

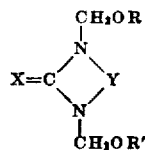

wherein X is a chalcogen of atomic weight less than 33, wherein Y is a divalent acyclic organic radical of chain length from 2 to 3 having terminal carbon atoms, having, in the case of a chain length of 3, the intermediate chain atom selected from the group consisting of carbon, oxygen, sulfur and nitrogen, the third bond of the nitrogen being attached to a monovalent hydrocarbon radical, all the hydrogen atoms in Y being attached to carbon, and wherein each of R and R' represents the nonhydroxyl portion of a monohydric alcohol boiling not higher than 210° C.

2. A composition comprising a polyvinyl butyral resin and, as a softening point elevating agent therefor, an ether of the formula

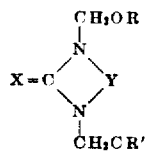

wherein X is a chalcogen of atomic weight less than 33, wherein Y is a divalent acyclic organic radical of chain length from 2 to 3 having terminal carbon atoms, having, in the case of a chain length of 3, the intermediate chain atom selected from the group consisting of carbon, oxygen, sulfur and nitrogen, the third bond of the nitrogen being attached to a monovalent hydrocarbon radical, all the hydrogen atoms in Y being attached to carbon, and wherein each of R and R' represents the nonhydroxyl portion of a monohydric alcohol boiling not higher than 210° C.

3. A composition comprising a polyvinyl butyral resin and, as a softening point elevating agent therefor, an ether of an N,N'-bis(hydroxymethyl)uron with a monohydric alcohol boiling not higher than 210° C.

4. A composition comprising a polyvinyl butyral resin and, as a softening point elevating agent therefor, N,N'-bis(methoxymethyl)uron.

5. A cement comprising a polyvinyl acetal resin and, as a softening point elevating agent therefor, an ether of the formula

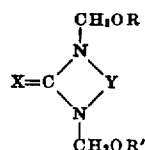

wherein X is a chalcogen of atomic weight less than 33, wherein Y is a divalent acyclic organic radical of chain length from 2 to 3 having terminal carbon atoms, having, in the case of a chain length of 3, the intermediate chain atom selected from the group consisting of carbon, oxygen, sulfur and nitrogen, the third bond of the nitrogen being attached to a monovalent hydrocarbon radical, all the hydrogen atoms in Y being attached to carbon, and wherein each of R and R' represents the nonhydroxyl portion of a monohydric alcohol boiling not higher than 210° C.

6. A cement comprising a polyvinyl acetal resin and, as a softening point elevating agent therefor, an ether of an N,N'-bis(hydroxymethyl)uron with monohydric alcohol boiling not higher than 210° C.

7. A cement comprising a polyvinyl acetal resin, and, as a softening point elevating agent therefor, N,N'-bis(methoxymethyl)uron.

CHARLES WILLIAM JOHNSON.

CERTIFICATE OF CORRECTION.

Patent No. 2,384,034.   September 4, 1945.

CHARLES WILLIAM JOHNSON.

It is hereby certified that error appears in the printed specification of the above numbered patent requiring correction as follows: Page 3, first column, line 50, claim 2, for that portion of the formula reading "CH$_2$CR'" read --CH$_2$OR'--; and that the said Letters Patent should be read with this correction therein that the same may conform to the record of the case in the Patent Office.

Signed and sealed this 29th day of January, A. D. 1946.

Leslie Frazer (Seal)   First Assistant Commissioner of Patents.

The cements of this invention may be employed for general cementing purposes such as joining metal surfaces to metal surfaces (particularly aluminum to aluminum), preparation of shatterproof glass, shoe cements and for laminating fabric, paper, and the like, but are particularly useful in the cementing of plywood since hitherto polyvinyl acetal resins have suffered from the disadvantage of such a low softening point as to preclude their use in plywood for many applications, e. g., in aircraft construction.

The above description and examples are intended to be illustrative only. Any modification of or variation therefrom which conforms to the spirit of the invention is intended to be included within the scope of the claims.

What is claimed is:

1. A composition comprising a polyvinyl acetal resin and, as a softening point elevating agent therefor, an ether of the formula

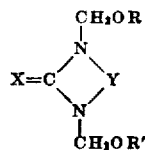

wherein X is a chalcogen of atomic weight less than 33, wherein Y is a divalent acyclic organic radical of chain length from 2 to 3 having terminal carbon atoms, having, in the case of a chain length of 3, the intermediate chain atom selected from the group consisting of carbon, oxygen, sulfur and nitrogen, the third bond of the nitrogen being attached to a monovalent hydrocarbon radical, all the hydrogen atoms in Y being attached to carbon, and wherein each of R and R' represents the nonhydroxyl portion of a monohydric alcohol boiling not higher than 210° C.

2. A composition comprising a polyvinyl butyral resin and, as a softening point elevating agent therefor, an ether of the formula

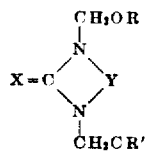

wherein X is a chalcogen of atomic weight less than 33, wherein Y is a divalent acyclic organic radical of chain length from 2 to 3 having terminal carbon atoms, having, in the case of a chain length of 3, the intermediate chain atom selected from the group consisting of carbon, oxygen, sulfur and nitrogen, the third bond of the nitrogen being attached to a monovalent hydrocarbon radical, all the hydrogen atoms in Y being attached to carbon, and wherein each of R and R' represents the nonhydroxyl portion of a monohydric alcohol boiling not higher than 210° C.

3. A composition comprising a polyvinyl butyral resin and, as a softening point elevating agent therefor, an ether of an N,N'-bis(hydroxymethyl)uron with a monohydric alcohol boiling not higher than 210° C.

4. A composition comprising a polyvinyl butyral resin and, as a softening point elevating agent therefor, N,N'-bis(methoxymethyl)uron.

5. A cement comprising a polyvinyl acetal resin and, as a softening point elevating agent therefor, an ether of the formula

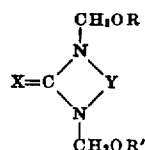

wherein X is a chalcogen of atomic weight less than 33, wherein Y is a divalent acyclic organic radical of chain length from 2 to 3 having terminal carbon atoms, having, in the case of a chain length of 3, the intermediate chain atom selected from the group consisting of carbon, oxygen, sulfur and nitrogen, the third bond of the nitrogen being attached to a monovalent hydrocarbon radical, all the hydrogen atoms in Y being attached to carbon, and wherein each of R and R' represents the nonhydroxyl portion of a monohydric alcohol boiling not higher than 210° C.

6. A cement comprising a polyvinyl acetal resin and, as a softening point elevating agent therefor, an ether of an N,N'-bis(hydroxymethyl)uron with monohydric alcohol boiling not higher than 210° C.

7. A cement comprising a polyvinyl acetal resin, and, as a softening point elevating agent therefor, N,N'-bis(methoxymethyl)uron.

CHARLES WILLIAM JOHNSON.

---

CERTIFICATE OF CORRECTION.

Patent No. 2,384,034. September 4, 1945.

CHARLES WILLIAM JOHNSON.

It is hereby certified that error appears in the printed specification of the above numbered patent requiring correction as follows: Page 3, first column, line 50, claim 2, for that portion of the formula reading "CH$_2$CR'" read --CH$_2$OR'--; and that the said Letters Patent should be read with this correction therein that the same may conform to the record of the case in the Patent Office.

Signed and sealed this 29th day of January, A. D. 1946.

Leslie Frazer (Seal) First Assistant Commissioner of Patents.